United States Patent [19]
McDoulett, Jr. et al.

[11] Patent Number: 5,443,619
[45] Date of Patent: Aug. 22, 1995

[54] PROCESS FOR EXTRACTING METALS FROM SOLUTION

[75] Inventors: C. Dale McDoulett, Jr., Tulsa, Okla.; George W. Reschke, Oakville, Canada

[73] Assignee: North American Palladium Ltd., Toronto, Canada

[21] Appl. No.: 317,371

[22] Filed: Oct. 4, 1994

[51] Int. Cl.$^6$ ................................................. C22B 3/46
[52] U.S. Cl. ........................................ 75/421; 75/423; 423/43; 423/144
[58] Field of Search ............... 75/421, 423; 423/43, 423/144

[56] References Cited

U.S. PATENT DOCUMENTS

| | | |
|---|---|---|
| 641,550 | 1/1900 | Rothberg . |
| 948,827 | 2/1910 | Rosalt . |
| 1,207,243 | 12/1916 | Vadner . |
| 1,370,646 | 3/1921 | Hayward et al. . |
| 1,696,471 | 12/1928 | Christensen . |
| 2,829,967 | 4/1958 | Schlecht .............................. 75/114 |
| 2,831,751 | 4/1958 | Birner .................................. 23/61 |
| 3,196,005 | 7/1965 | Moore .................................. 75/108 |
| 3,800,024 | 3/1974 | Forsell et al. ........................ 423/55 |
| 4,006,215 | 2/1977 | Hall et al. ............................ 423/142 |
| 5,082,638 | 1/1992 | Saikkonen et al. ................ 423/145 |
| 5,364,444 | 11/1994 | McDoulett, Jr. et al. .......... 75/421 |

Primary Examiner—Melvyn J. Andrews
Attorney, Agent, or Firm—Dougherty, Hessin, Beavers & Gilbert

[57] ABSTRACT

A process for extracting iron, copper, and nickel from a solution containing iron, copper, nickel, and at least one contaminent selected from the group comprising magnesium, aluminum, calcium and sodium, wherein each of said solutes is present at its respective chloride. In the process, calcium oxide or calcium hydroxide are added as a precipitating agent in incremental steps to cause incremental increases in the pH of the solution. At each increasing pH, one of the aforesaid metals will precipitate as the corresponding metal hydroxide while leaving the remaining metals in solution. The metal hydroxide precipitate is separated from the remaining solution prior to the subsequent addition of the precipitating agent.

7 Claims, 2 Drawing Sheets

PROCESS FOR EXTRACTING METALS FROM SOLUTION

FIELD OF THE INVENTION

This invention relates to metal recovery processes, and more particularly, to processes to extract iron, copper and nickel from a solution in which the aforesaid metal solutes are present as their respective chlorides.

BACKGROUND OF THE INVENTION

Previous methods for recovering precious metals from a flotation concentrate involve smelting the concentrate to produce a "matte" in which metals values are further concentrated. The matte is then subjected to a series of leaching steps to leach out the base metals. Generally, a separate leaching step is used for each base metal to be removed. The precious metals are then leached out and removed from each of the leaching solutions in subsequent recovery steps.

The traditional process described above has several shortcomings. Firstly, smelting is generally an environmentally undesirable process because of the gasses given off and the problem of disposal of solid residue. Furthermore, if the concentrate has a high magnesia content, the melting temperature of the concentrate may be too high to be effectively smelted. Still furthermore, using a plurality of leaching steps is relatively costly and some of these steps also contribute to further environmental contaminants.

U.S. patent application Ser. No. 08/089,088, filed on Jul. 8, 1993 and now issued as U.S. Pat. No. 5,364,444, which is hereby incorporated by reference herein, discloses a process (hereinafter referred to as the "new process") in which all of the precious metals and various additional metals are dissolved as one of the process steps. The precious metals are separated from solution leaving a solution containing iron, copper, nickel and various contaminants such as magnesium, aluminium, calcium and sodium. Each of the solutes is present as the respective metal chloride in an acidic solution. It is an object of the present invention to remove the iron, copper, and nickel individually from the solution, subsequently to remove the contaminants from the solution and then to convert the remaining solution to hydrochloric acid which may be re-used in the initial process.

SUMMARY OF THE INVENTION

A process for extracting iron, copper, nickel from a solution containing iron, copper, nickel and at least one contaminant selected from the group consisting of magnesium, aluminium, calcium and sodium wherein each of said solutes is present as a metal chloride and said solution has a pH of less than 1.0, said process comprising the steps of:

i) adding a precipitating agent selected from the group consisting of calcium oxide and calcium hydroxide to raise the pH of said solution to approximately 1.0 thereby causing said iron to precipitate as ferric hydroxide;

ii) separating said ferric hydroxide precipitate from the remaining solution;

iii) adding more of said precipitating agent to said remaining solution to raise the pH of said remaining solution from step ii to approximately 3.0 thereby causing said copper to precipitate as cupric hydroxide;

iv) separating said cupric hydroxide precipitate from the remaining solution;

iv) adding more of said precipitating agent to said remaining solution to increase the pH of said remaining solution from step iv to about 4.0 thereby causing said nickel to precipitate as nickel hydroxide;

vi) separating said nickel hydroxide precipitate from the remaining solution;

vii) adding more of said precipitating agent to said remaining solution to increase the pH of said remaining solution from step vi to approximately 8.8 thereby causing said contaminants to precipitate as their respective hydroxides;

viii) separating said precipitated contaminants from the remaining solution;

ix) adding a sufficient amount of sulphuric acid to said remaining solution from step viii to convert said remaining solution from step viii to calcium sulphate and hydrochloric acid; and x) separating said calcium sulphate from said hydrochloric acid.

DESCRIPTION OF PREFERRED EMBODIMENTS

Figure 1:
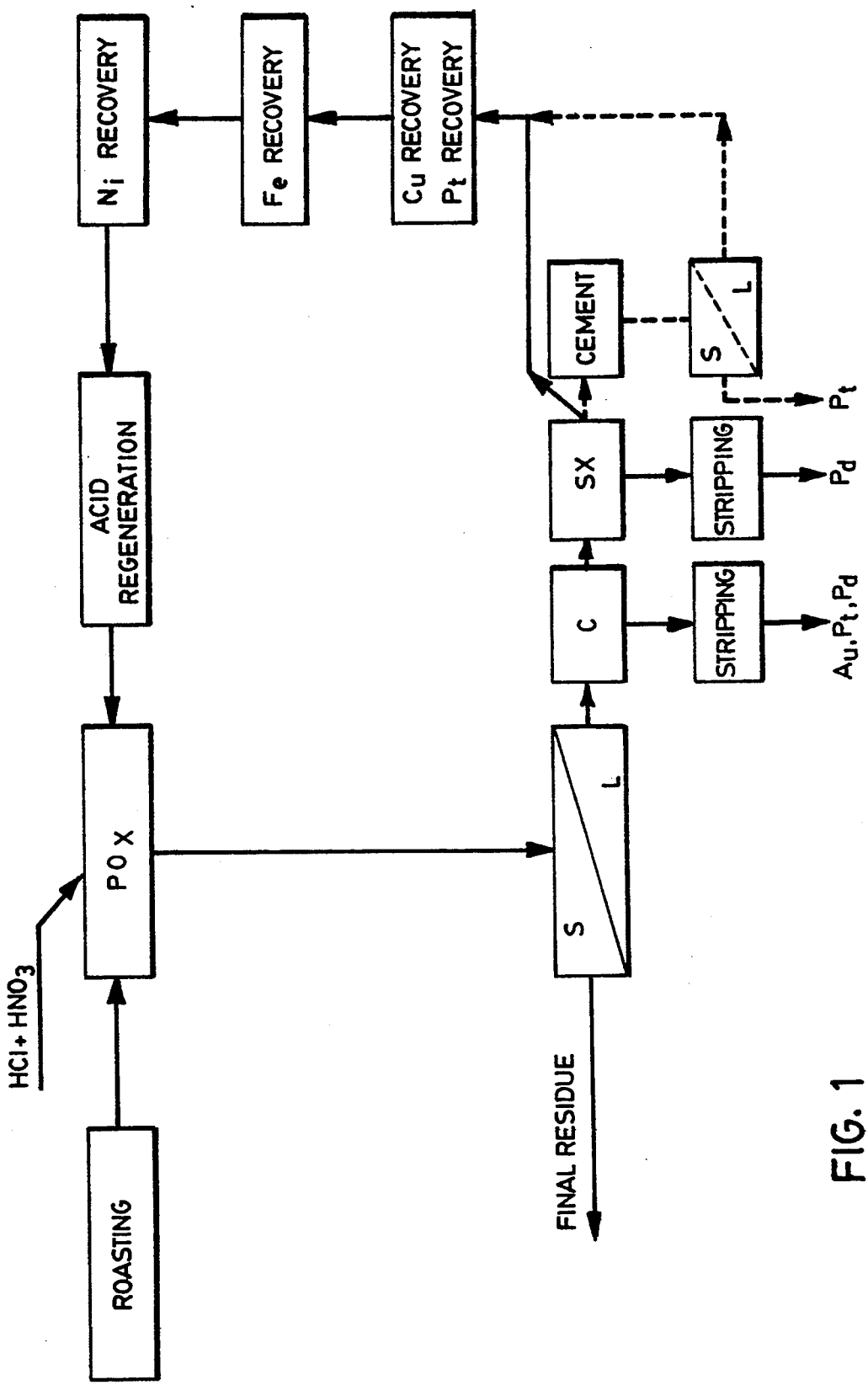
FIG. 1 is a schematic diagram of the new process referred to above.

The process of the present invention was developed to treat the resulting solution after recovering gold, platinum, palladium, copper and nickel from bulk sulfide concentrates obtained from Lac Des Iles flotation mill through the use of acid leaching procedures. A typical range of analysis for the valuable metals and impurities contained in the concentrates are set out in Table 1 below.

TABLE 1

| Element | g/t; % | Element | % | Element | % |
| --- | --- | --- | --- | --- | --- |
| Gold | 4–6 g/t | Barium | 0.002 | Sodium | 0.20 |
| Platinum | 4–6 g/t | Beryllium | <0.0001 | Neodymium | <0.005 |
| Palladium | 50–80 g/t | Calcium | 0.31 | Phosphorus | <0.002 |
| Copper | 2.5–3.0 | Cadmium | 0.001 | Lead | <0.082 |
| Nickel | 1.8–2.5 | Cobalt | 0.13 | Tin | <0.002 |
| Iron | 12.0–12.5 | Chromium | 0.020 | Tellurium | <0.003 |
| Sulphur | 6–8 | Arsenic | 0.008 | Antimony | <0.001 |
| Aluminium | 1–3 | Lanthanum | <0.001 | Selenium | 0.008 |
| Magnesium | 3–6 | Manganese | 0.044 | Yttrium | <0.001 |
| Silica | 30–40 | Molybdenum | <0.01 | Zinc | 0.26 |

The main metal values contained in the concentrates are the Platinum Group Metals (PGM), gold (Au), copper (Cu), and nickel (Ni). The PGM are constituted by more or less complex sulphides, tellurides, arsenides, and alloys; Au appears native and as a telluride. The main sulphide constituents are chalchopyrite and pentlandite, but there are also minor amounts of pyrite and pyrrhotite.

Previous commercial procedures used in the leaching of PGM and Au consisted generally of an intermediate smelting stage, prior to leaching, to obtain a "matte" in which the metal values are further concentrated.

The first step of the new process is to roast the concentrate by heating the concentrate in an oxygen-containing environment such as air to oxidize a portion of the sulfur. It has been found that the roasting is best carried out at between 900° and 1200° F. The oxidation of sulfur during the roasting stage can be enhanced by agitating the concentrate ("rabbling") to better expose the sulfur in the concentrate to the oxidizing atmosphere. The roasting should be carried out until the sulfur content is reduced to about two percent.

It has been found that if roasting is carried out at too high or too low a temperature, the leachability of PGM in subsequent steps of the process is adversely affected. Although exact maximum and minimum temperatures have not been determined, effective results may be obtained by roasting in air within the temperature range set out above.

After the concentrate has been roasted, it is leached with an acid solution which is a blend of hydrochloric and nitric acids. The leaching is carried out in a glass-lined autoclave, heated to a moderate temperature and pressurized with a moderate pressure of oxygen gas.

When the initial development work was commenced for treatment of the above concentrates, the initial test work was directed at directly leaching the metals values from the concentrate. Direct leaching of the metal values provided Au recovery of 94–98%; Pt 29–38%; Pd, 90–93%; Cu, 98–99%; Ni, 93–96%. Leaching of the roasted concentrate gave an Au recovery of 95–98%; Pt, 94–95%; Pd, 87–91%; Cu, 78–96%; Ni, 82–92%. Surprisingly, and quite unexpectedly, the roasting process resulted in an almost three-fold increase in Pt recovery. As Pt is a very valuable metal, such an increase is very significant as it favourably impacts on the economics of the process.

It has been found that the rate of dissolution of metal sulphides in a slurry is greatly enhanced if the slurry carries oxygen in the solution. One way of providing the oxygen is to add small amounts of nitric acid in a closed vessel. Providing oxygen gas at a moderate pressure of around 50 p.s.i.g. enables the nitric acid to be continuously regenerated by the oxygen gas being applied.

Satisfactory results have been achieved with a hydrochloric acid to nitric acid ratio of around 50:1. It is expected that leaching may be carried out with a hydrochloric to nitric acid ration of from 100:1 to 3:1.

Moderately heating the acid and roasted concentrate mixture assists the leaching process. Effective results have been achieved at a temperature of around 190° F. The temperature should be kept below the melting temperature of sulfur as it has been found that poor recovery of precious metals in the solution occurred at reaction temperatures of 135° C. or higher (288.5° F.).

Satisfactory results have been obtained using oxygen at approximately 50 p.s.i.g. It may be possible to substitute oxygen for air in the autoclave, if the autoclave is designed with enough free space to contain the necessary amount of air and to withstand the higher pressure requirements.

Once the leaching operation is substantially completed, the solution of acid and metal sulphides is separated from any undissolved portion of the roasted concentrate. The above leaching process is capable of forming solutions of gold, palladium, platinum, copper and nickel.

The final step of the new process is to retrieve the dissolved metals from the solution. Gold may be collected on activated carbon in an acidic solution. Similarly, the palladium and platinum may also be collected on activated carbon.

Palladium may be removed from the solution by solvent extraction, for example by mixing with dioctyl or dihexyl sulfide. At this stage, the solution may contain copper, platinum, nickel and iron. Platinum may be removed by cementation with a copper powder or the solution may be electrolyzed in an electrolytic cell to collect both the copper and platinum on the cathode.

The remaining nickel and iron solution may be treated by precipitating the nickel and iron together as a hydroxide which may then be sold to a smelter. Alternatively, a portion of the iron may be oxidized in an autoclave to form a ferric oxide precipitate which may be separated. The balance of the dissolved iron may be precipitated outside of the autoclave as a ferric hydroxide.

If the iron is removed separately from the nickel, the solution will still contain nickel. Nickel may be removed as a hydroxide, as a carbonate or through electrolysis as nickel plate. If calcium is used as a precipitating agent, this will leave a spent solution of calcium chloride.

It is desirable to regenerate the hydrochloric acid used in the process. This may be accomplished by reacting the calcium chloride solution with sulphuric acid to give hydrochloric acid and calcium sulfate as products. The calcium sulfate may be separated as a solid from the hydrochloric acid and sold as such, for example, for use in the building industry as gypsum. The hydrochloric acid may then be reused in the process.

As an alternative to the above, platinum may be removed through solvent extraction using known solvent extraction techniques. This would leave a solution containing iron, copper, nickel and various contaminants. The contaminants would mainly comprise magnesium and aluminium, however calcium and sodium may also be present.

Iron can be precipitated from the latter solution by adding calcium oxide or calcium hydroxide as a precipitating agent to increase the pH of the solution to 1.0. At pH 1.0, over 99% of the iron would typically precipitate as ferric hydroxide. The ferric hydroxide may be removed through solid/liquid separation.

A further increase of pH from 1.0to 3.0 by adding more calcium oxide or calcium hydroxide will cause the copper to precipitate as cupric hydroxide. The cupric hydroxide precipitate may be removed by solid/liquid separation.

Further increasing the pH to 4.0 by adding more calcium oxide or calcium hydroxide will cause nickel to precipitate as nickel hydroxide. The nickel hydroxide may be removed through a solid/liquid separation step.

Still further increasing the pH to 8.8 by adding more calcium oxide or calcium hydroxide will result in the majority of the remaining contaminants being removed as hydroxides. Once again, solid/liquid separation may be performed to remove the hydroxides.

At this stage, the solution will be primarily calcium chloride, as most of the metals were present in the solution as chlorides. The addition of calcium hydroxide would therefore yield calcium chloride plus a metal hydroxide. As suggested above, sulphuric acid may be added to the calcium chloride solution to yield calcium sulphate and hydrochloric acid. The hydrochloric acid may be reused in the extraction process. The calcium sulphate may be sold to the construction industry as plaster.

The calcium oxide/calcium hydroxide precipitation technique is preferably performed in each step at a temperature from 50° C. to boiling however it is believed that the technique may work at lower typical ambient temperatures.

Various aspects of the present invention may be more fully described by reference to the examples set out below.

EXAMPLE 1

Figure 2:
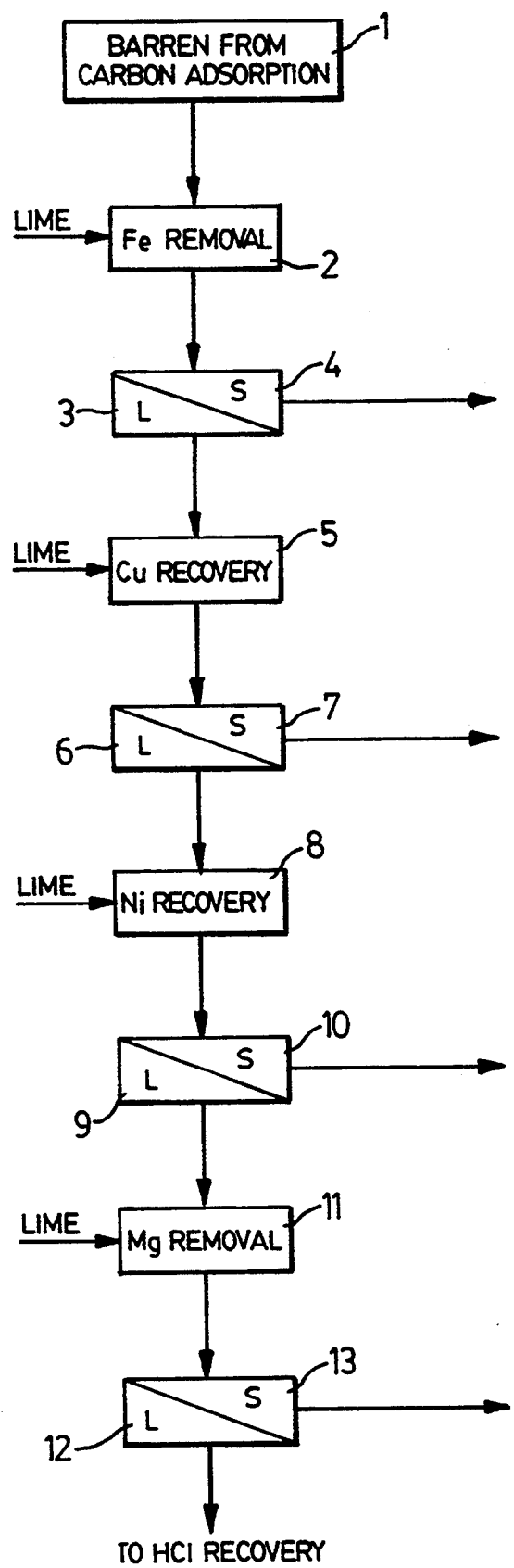
FIG. 2 is a flow chart showing the treatment of barren leach solution according to the present invention.

FIG. 2 is a flow chart showing the treatment of barren leach solution with lime to remove iron, recover copper and nickel and remove magnesium. The analysis of the solution at various stages in the process, and experimental conditions are set out below with reference to the reference numerals in FIG. 2.

| Reference Number in FIG. 2 | Analysis and Experimental Conditions |
|---|---|
| 1 | Concentration: 18.6 g/L Cu, 10.1 g/L Ni, 44.7 g/L Fe, 161 g/L Cl, 48 g/L $SO_4$, 8.5 g/L Al, 4.6 g/L Mg, 0.52 g/L Ca, 0.43 g/L Na pH <0, EMF 830 mV |
| 2 | pH: ~1 EMF: ~680 mV (natural) Temperature: ~85° C. Lime: 129 kg/m$^3$ |
| 3 | Solution Concentration: 19.1 g/L Cu, 10.2 g/L Ni, 0.15 g/L Fe, 163 g/L Cl, 0.53 g/L $SO_4$, 7.7 g/L Al, 5.1 g/L Mg, 49 g/L Ca, 0.51 g/L Na pH 0.9, EMF 680 mV |
| 4 | Solid Composition: 32% Fe, 0.05% Cu, 0.005% Ni, 1% Al, 0.003% Mg, 10% Ca, 0.03% Na, ~33% $SO_4$ Weight: 143 kg/m$^3$ feed Estimated Removal: 99.7% Fe, 9.2% Al, 99% $SO_4$ |
| 5 | pH: ~3 EMF: ~550 mV (natural) Temperature: ~85° C. Lime: 42 kg/m$^3$ |
| 6 | Solution Concentration: 0.58 g/L Cu, 6.9 g/L Ni 0.04 g/L Fe, ~140 g/L Cl, 0.5 g/L $SO_4$, ~3 g/L Al, ~5 g/L Mg, ~65 g/L Ca, 0.50 g/L Na pH 3, EMF 550 mV |
| 7 | Solid Composition: 35% Cu, 4.6% Ni, 0.25% Fe, 7.8% Al, 0.62% Mg, 0.12% Ca, 0.05% Na, ~0.1% $SO_4$ Weight: 51 kg/m$^3$ feed Estimated Recovery: 97% Cu, 32% Ni, 0.2% Fe 43% Al, 6% Mg |
| 8 | pH: ~4 EMF: ~365 mV (natural) Temperature: ~85° C. Lime: 14 kg/m$^3$ |
| 9 | Solution Concentration: 0.13 g/L Cu, 0.21 g/L Ni, <1 mg/L Fe, 123 g/L Cl, 0.4 g/L $SO_4$, 0.03 g/L Al, 4.8 g/L Mg, 75 g/L Ca, 0.50 g/L Na pH 4, EMF 365 mV |
| 10 | Estimated Solid Composition: 29% Ni, 2% Cu, 13% Al, 1% Mg, 0.5% $SO_4$ Weight: 23 kg/m$^3$ feed Estimated Recovery: 66% Ni, 2% Cu, 47% Al, 3% Mg |
| 11 | pH: ~8.8 EMF: ~ −28 mV (natural) Temperature: ~85° C. Lime: 18 kg/m$^3$ |
| 12 | Solution Concentration: 0.002 g/L Cu, <1 mg/L Ni, <1 mg/L Fe, 120 g/L Cl, 0.36 g/L $SO_4$, 0.002 g/L Al, 0.01 g/L Mg, 93 g/L Ca, 0.33 g/L Na pH 8.8, EMF −28 mV |
| 13 | Solid Composition: 37% Mg, 1% Cu, 1.6% Ni, 0.06% Fe, 0.3% Al, 1.3% Ca, 0.1% Na Weight: 15 kg/m$^3$ feed Estimated Removal: 1% Cu, 2% Ni, 0.3% Al, 91% Mg |

EXAMPLE 2

A test was designed to purify the barren solution from a carbon loading test.

A feed solution (1000 mL) was placed in a two liter beaker. The test was conducted at a temperature of 80°-90° C. Agitating and heating were provided with a magnetic stirrer/heater.

Lime slurry was added to the solution to raise the pH and to precipitate iron and copper. Deionized water was added as required to compensate for evaporation. A thief sample was taken during the test to determine intermediate removal of impurities.

Following the test, the slurry was filtered and the filter cake was washed several times with hot deionized water. The first part of the wash which contained most of the trapped solution was added to the filtrate to adjust the volume back to approximately the starting volume less volume of thief sample. A sample was submitted for chemical analysis and the remainder of the wash was saved. The results are shown in table 2.

TABLE 2

| Lapsed Time h | Temp. °C. | pH | EMF mV | Cuml wt. of Lime Added g | Estim. Sol. Vol. mL | Samples | Amount mL, g |
|---|---|---|---|---|---|---|---|
| 0 | 50 | <0 | 830 | 0 | 1000 | | |
| 0.5 | 92 | <0 | | 10 | | | |
| 1 | 90 | 0.03 | 810 | 35 | 1000 | Sol 1 | 25 |

TABLE 2-continued

| | | | | | | | Solid 1 | 0.6^ |
|---|---|---|---|---|---|---|---|---|
| 2 | 90 | 0.7 | | 53 | | 975 | | |
| 2.5 | 88 | 0.8 | | 116 | | | | |
| 3 | 88 | 1.3 | | 129 | | | | |
| 3.5 | 85 | 0.9 | 680 | 129 | | 975 | Sol. 2 | 20 |
| | | | | | | | Cake | 143^^ |

| Lapsed Time h | Analyses (mg/L, %) | | | | | | | | Comments |
|---|---|---|---|---|---|---|---|---|---|
| | Fe | Cu | Ni | Al | Mg | Ca | Na | SO4 | Cl | |
| 0 | 44650 | 18580 | 10130 | 8500 | 4590 | 520 | 430 | 48000 | 160580 | Sol. bright green |
| 0.5 | | | | | | | | | | Sol. slight brown |
| 1 | 44820 | 18410 | 10080 | | | | | | | |
| | 0.13* | 0.006* | 0.004* | 0.011* | 0.003* | 27.7* | 0.082* | | | White ppl. |
| 2 | | | | | | | | | | Lot of ppt. |
| 2.5 | | | | | | | | | | |
| 3 | | | | | | | | | | |
| 3.5 | 152 | 19070 | 10230 | 7720 | 5140 | 49250 | 510 | 530 | 162850 | Sol. bright green |
| | 32.2* | 0.051* | 0.005* | 1.0* | 0.003* | 10.4* | 0.033* | | | Brown ppl. |
| | | | | | | | | | | Wash 710 mL |

*Semi-quantitative
^Solid collected from 25 mL sample
^^Total weight of filter cake

EXAMPLE 3

A test was designed to recover copper and nickel from purified barren solution from the test in Example 2.

The purified solution from the test in Example 2 (955 mL) was placed in a two liter beaker. The test was conducted at a temperature of 80°–90° C. Agitation and heating were provided with a magnetic stirrer/heater.

Lime slurry was added to the solution to raise the pH and to precipitate nickel. Dionized water was added as required to compensate for evaporation. Thief samples were taken during the test to determine the intermediate recoveries of copper and nickel.

Following the test, the slurry was filtered, the filter cake was washed several times with hot deionized water. The first part of the wash which contained most of the trapped solution was added to the flitrate to adjust the volume back to approximately the starting volume less volume of thief samples. A sample was then submitted for chemical analysis. The remainder of the wash was saved. The precipitate was submitted for Cu, Ni, and Fe, analysis, and for a semi-quantitative ICP scan. Test results are show in Table 3.

TABLE 3

| Lapsed Time h | Temp. °C. | pH | EMF mV | Cuml wt. of Lime Added g | Estim. Sol. Vol. mL | Samples | Amount mL, g |
|---|---|---|---|---|---|---|---|
| 0 | 85 | 0.4 | 620 | 0 | 955 | | |
| 0.5 | 90 | 0.9 | | 15 | | | |
| 1.5 | 90 | 2.1 | 640 | 34 | 955 | Sol. 1 | 25 |
| | | | | | | Solid 1 | 0.5^ |
| 3 | 88 | 3.0 | 550 | 40 | 930 | Sol. 2 | 25 |
| | | | | | | Solid 2 | 1.25^ |
| 4.5 | 90 | 4.0 | 386 | 53 | 900 | Sol. 3 | 50 |
| | | | | | | Cake | 67.5^^ |

| Lapsed Time h | Analyses (mg/L, %) | | | | | | | | | Comments |
|---|---|---|---|---|---|---|---|---|---|---|
| | Fe | Cu | Ni | Al | Mg | Ca | Na | SO4 | Cl | |
| 0 | 152 | 19070 | 10230 | 7720 | 5140 | 49250 | 510 | 530 | 162850 | Sol. bright green |
| 0.5 | | | | | | | | | | |
| 1.5 | 74 | 9040 | 7880 | | | | 490 | | | Sol. bright green |
| | 0.36* | 30.4* | 4.3* | 8.3* | 0.93* | 0.30* | 0.11* | | | Green ppt. |
| 3 | 43 | 580 | 6920 | | | | 500 | | | Sol. bright green |
| | 0.25* | 35.4* | 4.6* | 7.8* | 0.62* | 0.12* | 0.05* | | | Green ppt. |
| 4.5 | 0.2 | 128 | 208 | 26 | 4760 | 75250 | 500 | 408 | 122560 | Sol. almost clear |
| | 0.24 | 24.1 | 12.9 | 9.1* | 0.61* | 0.13* | 0.05* | | | Green ppt |
| | | | | | | | | | | Wash 210 mL |

*Semi-quantitative
^Solid collected from 25 mL sample
^^Total weight of filter cake

EXAMPLE 4

The purpose of this test was to remove magnesium from the nickel-barren solution from the test of Example 3.

The solution from Example 3 (850 mL) was placed in a two liter beaker. The test was conducted at a temperature of 80°–90° C. Agitation and heating were provided with a magnetic stirrer/heater.

Lime slurry was added to the solution to raise the pH and to precipitate Al and Mg. Deionized water was added as required to compensate for evaporation. A thief sample was taken during the test to determine the intermediate removal of Mg.

Following the test, the slurry was filtered. The filter cake was washed several times with hot deionized water. The first part of the wash which contained most of the trapped solution was added to the flitrate to adjust the volume back to approximately the starting volume less volume of thief sample. A sample was then submitted for chemical analysis. The remainder of the wash was saved. The precipitates were submitted for a semi-quantitative ICP scan.

Test results are reported in Table 4.

Tables 5 and 6 summarize the results of the tests of Example 2, 3 and 4. Example 2 is identified as Test R1, Example 3 is identified as Test R2, and Example 4 is identified as Test R3.

TABLE 5

| Elements | Concentration (%) | | | | | | |
|---|---|---|---|---|---|---|---|
| | Test R1 Solid 1 | Test R1 Final Solid | Test R2 Solid 1 | Test R2 Solid 2 | Test R2 Final Solid | Test R3 Solid 1 | Test R3 Final Solid |
| Al | 0.011 | 1.0 | 8.3 | 7.8 | 9.1 | 0.27 | 0.065 |
| As | <0.001 | <0.02 | <0.05 | <0.05 | <0.06 | <0.002 | <0.001 |
| Ba | 0.001 | <0.0005 | 0.0005 | <0.0005 | <0.0005 | <0.0005 | <0.0005 |
| Be | <0.0001 | <0.0001 | <0.0001 | <0.0001 | <0.0001 | <0.0001 | <0.0001 |
| Ca | 27.7 | 10.4 | 0.30 | 0.12 | 0.13 | 1.3 | 49.0 |
| Cd | <0.0005 | <0.005 | <0.0005 | <0.0005 | <0.0005 | <0.005 | <0.0005 |
| Co | <0.0005 | 0.002 | 0.12 | 0.19 | 0.45 | 0.10 | 0.008 |
| Cr | 0.004 | 0.078 | 0.006 | 0.005 | 0.006 | 0.002 | 0.001 |
| Cu | 0.006 | 0.051 | 30.4 | 35.4 | 24.5 | 1.0 | 0.083 |
| Fe | 0.13 | 32.2 | 0.36 | 0.25 | 0.25 | 0.063 | 0.038 |
| La | <0.001 | <0.01 | <0.0005 | <0.0005 | <0.0005 | <0.0005 | <0.0005 |
| Mg | 0.003 | 0.003 | 0.93 | 0.62 | 0.61 | 37.1 | 3.2 |
| Mn | <0.0005 | <0.0005 | 0.006 | 0.012 | 0.070 | 0.10 | 0.009 |
| Mo | <0.002 | <0.002 | <0.02 | <0.02 | <0.02 | <0.04 | <0.005 |
| Na | 0.082 | 0.033 | 0.11 | 0.053 | 0.054 | 0.088 | 0.047 |
| Ni | 0.004 | 0.005 | 4.3 | 4.6 | 13.6 | 1.6 | 0.12 |
| Pb | 0.003 | 0.008 | 0.015 | 0.016 | 0.042 | 0.027 | 0.002 |
| P | 0.003 | 0.013 | <0.001 | <0.001 | <0.001 | 0.013 | 0.006 |
| Sb | <0.001 | <0.003 | <0.001 | <0.001 | <0.001 | <0.001 | <0.001 |
| Se | <0.005 | <0.02 | <0.005 | <0.005 | <0.005 | <0.005 | <0.005 |
| Sn | <0.002 | <0.02 | <0.002 | <0.002 | <0.002 | <0.002 | <0.002 |
| Te | <0.001 | <0.005 | <0.02 | <0.02 | <0.02 | <0.001 | <0.001 |
| Y | <0.0005 | <0.0005 | <0.0005 | <0.0005 | <0.0005 | <0.0005 | <0.0005 |
| Zn | 0.001 | 0.001 | 0.021 | 0.026 | 0.18 | 0.86 | 0.063 |

TABLE 4

| Lapsed Time h | Temp. °C. | pH | EMF mV | Cuml wt. of Lime Added g | Estim. Sol. Vol. mL | Samples | Amount mL, g |
|---|---|---|---|---|---|---|---|
| 0 | 87 | 4.6 | 410 | 0 | 850 | | |
| 0.2 | 80 | 7.5 | | 4 | | | |
| 0.25 | 80 | 8.3 | −60 | 13 | | | |
| 0.5 | 82 | 8.6 | −75 | 15 | | | |
| 0.75 | 82 | 8.8 | −28 | 15 | 850 | Sol. 1 | 30 |
| | | | | | | Solid 1 | 0.45^ |
| 1 | 85 | 9.0 | | 18 | | | |
| 1.25 | 85 | 9.05 | | 37 | | | |
| 1.5 | 87 | 9.1 | | 89 | | | |
| 3 | 87 | 9.05 | −44 | 142 | 820 | Sol. 2 | 60 |
| | | | | | | Cake | 135^^ |

| Lapsed Time h | Analyses (mg/L, %) | | | | | | | | | Comments |
|---|---|---|---|---|---|---|---|---|---|---|
| | Fe | Cu | Ni | Al | Mg | Ca | Na | SO4 | Cl | |
| 0 | 0.2 | 128 | 208 | 26 | 4760 | 75250 | 500 | 408 | 122560 | Sol. almost clear |
| 0.2 | | | | | | | | | | Green ppt. |
| 0.25 | | | | | | | | | | Grey ppt. |
| 0.5 | | | | | | | | | | |
| 0.75 | 0.2 | 2.1 | 0.2 | 2.3 | 8.9 | 93500 | 327 | 357 | 110350 | Sol. clear |
| | 0.06* | 1.0* | 1.6* | 0.27* | 37.1* | 1.3* | 0.80* | | | Grey ppt. |
| 1 | | | | | | | | | | |
| 1.25 | | | | | | | | | | |
| 1.5 | | | | | | | | | | |
| 3 | 0.8 | 1.7 | <0.2 | 4.5 | 1.6 | 92500 | 370 | 305 | 131350 | Sol. clear |
| | 0.4* | 0.8* | 0.12* | 0.06* | 3.2* | 49* | 0.05* | | | White ppt. Wash 310 mL |

*Semi-quantitative
^Solid collected from 25 mL sample
^^Total weight of filter cake

TABLE 6

| Test Products | pH | EMF mV | Cumu. Lime Added g | Total Vol., Wt. mL, g | Analyses (mg/L, %) | | | | | | | | |
|---|---|---|---|---|---|---|---|---|---|---|---|---|---|
| | | | | | Fe | Cu | Ni | Al | Mg | Ca | Na | SO4 | NO3 | Cl |

Test R1 - Iron Removal

TABLE 6-continued

| Test<br>Products | pH | EMF<br>mV | Cumu.<br>Lime<br>Added<br>g | Total<br>Vol.,<br>Wt.<br>mL, g | Fe | Cu | Ni | Al | Mg | Ca | Na | SO4 | NO3 | Cl |
|---|---|---|---|---|---|---|---|---|---|---|---|---|---|---|
| Feed | <0 | 830 | 0 | 1000 | 44650 | 18580 | 10130 | 8500 | 4590 | 520 | 430 | 48000 | NA | 160580 |
| Intermediate Sample | | | | | | | | | | | | | | |
| Sol. 1 | 0.03 | 810 | 35 | 1000 | 44820 | 18410 | 10080 | NA | NA | NA | NA | NA | NA | NA |
| Solid 1 | | | | 24^ | 0.13* | 0.006* | 0.004* | 0.011* | 0.003* | 27.7* | 0.082* | NA | NA | NA |
| Removal** (%) | | | | | — | 0.9 | 0.5 | — | — | — | — | — | — | — |
| Final Products | | | | | | | | | | | | | | |
| Sol. 2 | 0.9 | 680 | 129 | 975 | 152 | 19070 | 10230 | 7720 | 5140 | 49250 | 510 | 530 | NA | 162850 |
| Solid 2 | | | | 143^^ | 32.2* | 0.051* | 0.005* | 1.0* | 0.003* | 10.4* | 0.033* | NA | NA | NA |
| Removal** (%) | | | | | 99.7 | — | — | 9.2 | — | — | 98.9 | — | — | |
| Test R2 - Nickel Recovery | | | | | | | | | | | | | | |
| Feed | 0.4 | 620 | 0 | 955 | 152 | 19070 | 10230 | 7720 | 5140 | 49250 | 510 | 530 | NA | 162850 |
| Intermediate Samples | | | | | | | | | | | | | | |
| Sol. 1 | 2.1 | 640 | 34 | 955 | 74 | 9040 | 7880 | NA | NA | NA | 490 | NA | NA | NA |
| Solid 1 | | | | 19^ | 0.36* | 30.4* | 4.3* | 8.3* | 0.93* | 0.30* | 0.11* | NA | NA | NA |
| Removal** (%) | | | | | 51.3 | 52.6 | 23.0 | — | — | — | 3.9 | — | — | — |
| Sol. 2 | 3.0 | 550 | 40 | 930 | 43 | 580 | 6920 | NA | NA | NA | 500 | NA | NA | NA |
| Solid 2 | | | | 47^ | 0.25* | 35.4* | 4.6* | 7.8* | 0.62* | 0.12* | 0.05* | NA | NA | NA |
| Removal** (%) | | | | | 71.7 | 97.0 | 32.4 | — | — | — | 2.0 | — | — | — |
| Final Products | | | | | | | | | | | | | | |
| Sol. 3 | 4.0 | 365 | 53 | 900 | 0.2 | 128 | 208 | 26 | 4760 | 75250 | 500 | 408 | NA | 122560 |
| Cake | | | | 67.5^^ | 0.24 | 24.1 | 12.9 | 9.1* | 0.61* | 0.13* | 0.05* | NA | NA | NA |
| Removal** (%) | | | | | 99.9 | 99.3 | 98.0 | 99.7 | 7.4 | — | 2.0 | 23.0 | — | 24.7 |
| Test R3 - Magnesium Removal | | | | | | | | | | | | | | |
| Feed | 4.6 | 410 | 0 | 850 | 0.2 | 128 | 208 | 26 | 4760 | 75250 | 500 | 408 | NA | 122560 |
| Intermediate Sample | | | | | | | | | | | | | | |
| Sol. 1 | 8.8 | −28 | 15 | 850 | 0.2 | 2.1 | 0.2 | 2.3 | 8.9 | 93500 | 327 | 357 | NA | 110350 |
| Solid 1 | | | | 13^ | 0.06* | 1.0* | 1.6* | 0.27* | 37.1* | 1.3* | 0.09* | NA | NA | NA |
| Removal** (%) | | | | | 0 | 98.4 | 99.9 | 91.3 | 99.8 | — | 34.6 | 12.5 | — | 10.0 |
| Final Products | | | | | | | | | | | | | | |
| Sol. 2 | 9.05 | −44 | 142 | 820 | 0.8 | 1.7 | <0.2 | 4.5 | 1.6 | 92500 | 370 | 305 | 1900 | 131350 |
| Cake | | | | 135^^ | 0.04* | 0.08* | 0.12* | 0.06* | 3.2* | 49* | 0.05* | NA | NA | NA |
| Removal** (%) | | | | | — | 98.6 | 100.0 | 82.6 | 100.0 | — | 26.0 | 25.3 | — | — |
| Overall Removal** (%)<br>(Feed R1 to Inter.<br>Sample R3) | | | 203 g | | 100.0 | 100.0 | 100.0 | 100.0 | 99.8 | — | 24.0 | 99.3 | — | 31.3 |
| Overall Removal** (%)<br>(Feed R1 to Final R3) | | | 353 g | | 100.0 | 100.0 | 100.0 | 99.9 | 100.0 | — | 14.0 | 99.4 | — | 18.2 |

Feed to R1: barren sol. from carbon adsorption Test C1.
Temperature: 80–90° C.
NA: not analyzed
*Semi-quantitative
**Based on sol. assay data
^Estimated
^^Actual from filtration

EXAMPLE 6

This test related to the regeneration of hydrochloric acid.

A feed was prepared by dissolving 5 grams of NaCl, 370 gams $CaCl_2$ in deionized water in a two liter volumetric flask to 2000 mL. The feed composition therefore contained approximately 120 g/L Cl, 1 g/L Na, 70 g/L Ca.

The test was carried out in a 500 mL beaker. Agitation and stirring were provided by a heater/magnetic stirrer.

Four tests were run in which different amounts of sulphuric acid were added. In the first three tests, the sulphuric acid was added directly to the feed solution. In the fourth test, 2.5 g/L $CaSO_4$ was added as a seed.

The slurry was heated as required to maintain a 40° C. temperature for thirty minutes. A final pH reading was obtained. The slurry was filtered and the flitrate assayed. The filter cake was washed, re-pulped, filtered and washed free of acid. The filter cake was then dried and weighed. Test results are shown in Tables 7 and 8.

TABLE 7

| | Conditions | | | | Actual | | | Check | |
|---|---|---|---|---|---|---|---|---|---|
| Test | H2SO4<br>% Stoi. | Temp.<br>°C. | Time<br>min | Seed<br>CaSO4<br>g/L | Feed<br>Vol<br>mL | H2SO4<br>97%<br>g/L | CaSO4<br>g | pH | Init.<br>Temp.<br>°C. |
| Feed | | | | | | | | 9.2 | |
| 1 | 87 | 40 | 30 | none | 200 | 148 | none | <0 | 42 |
| 2 | 108 | 40 | 30 | none | 200 | 185 | none | <0 | 42 |
| 3 | 130 | 48 | 30 | none | 200 | 222 | none | <0 | 53 |
| 4 | 108 | 40 | 30 | 2.5 | 200 | 185 | 0.5 | <0 | 41 |

| | Check | | Titration (Methyl Red) | | | |
|---|---|---|---|---|---|---|
| | Vol.<br>Filtr. | Cake<br>Wt. | Vol.<br>Aliquot | NaOH<br>2.45% | Equiv.<br>H2SO4 | Assay (g/L) |

TABLE 7-continued

| Test | mL | g | mL | mL | g/L | Ca | Na | Cl | SO4 |
|------|----|---|----|----|-----|------|------|-----|------|
| Feed |    |   |    |    |     | 64.3 | 0.91 | 114 | — |
| 1 | 80 | 34 | 5 | 25.4 | 152 | 8.15 | 0.88 | 114 | 6.78 |
| 2 | 83 | 39 | 5 | 31.6 | 190 | 1.91 | 0.88 | 112 | 28.9 |
| 3 | 74 | 39 | 5 | 36.7 | 220 | 0.89 | 0.83 | 107 | 59.7 |
| 4 | 97 | 37 | 1 | 8.3  | 189 | 1.94 | 0.87 | 117 | 28.6 |

TABLE 8

| | Conditions | | | | | Test (Used 200 mL Feed) | | | |
|---|---|---|---|---|---|---|---|---|---|
| Test 4 | H2SO4 % Stoi. | Temp. °C. | Time min | Seed CaSO4 g/L | H2SO4 97% g/L | CaSO4 g | Sol. pH | Init. Temp. °C. | |
| Feed |   |   |   |   |   |   | 9.2 |   | |
| 1 | 87  | 40 | 30 | none | 148 | none | <0 | 42 | |
| 2 | 108 | 40 | 30 | none | 185 | none | <0 | 42 | |
| 3 | 130 | 40 | 30 | none | 222 | none | <0 | 53 | |
| 4 | 108 | 40 | 30 | 2.5  | 185 | 0.5  | <0 | 41 | |

| | | | | Concentration (g/L, %) | | | | | | |
|---|---|---|---|---|---|---|---|---|---|---|
| Test 4 | Product | Vol. Filtr. mL | Cake Wt. g | Ca | Na | Cl | SO4 | Total Equiv. H2SO4 g/L | Calc. HCl g/L | Calc. H2SO4 g/L* | HCl Regenerated % |
| Feed |         |    |    | 64.3 | 0.91 | 114 | —   | —   | —   | —    | —   |
| 1 | Filtrate | 80 | —  | 8.15 | 0.88 | 114 | 6.78 | 152 | 108 | 6.9  | 92  |
|   | Cake**   | —  | 34 | 32.6 | −0.03 |    | 78.4 |    |    |      |    |
| 2 | Filtrate | 83 | —  | 1.91 | 0.88 | 112 | 28.9 | 190 | 119 | 29.5 | 102 |
|   | Cake**   | —  | 39*** | 31.9 | −0.03 |    | 73.8 |    |    |      |    |
| 3 | Filtrate | 74 | —  | 0.89 | 0.83 | 107 | 59.7 | 220 | 119 | 60.9 | 101 |
|   | Cake**   | —  | 39 | 32.5 | −0.011 |   | 73.8 |    |    |      |    |
| 4 | Filtrate | 97 | —  | 1.94 | 0.87 | 117 | 28.6 | 189 | 119 | 29.2 | 102 |
|   | Cake**   | —  | 37 | 33.6 | −0.03 |    | 78.0 |    |    |      |    |

*Assume all SO4 present as H2SO4 and all Ca present as CaCl2
**Calculated based on solution analyses.
***Analyzed 26.6% Ca and 65.4% SO4 (CaSO4.0.5 H2O)

The above description should be interpreted in an illustrative rather than a restrictive sense as modifications to the above description may be apparent to those skilled in the relevant art without departing from the spirit and scope of the present invention as defined by the claims set out below.

We claim:

1. A process for extracting iron, copper, nickel from a solution containing iron, copper, nickel and at least one contaminant selected from the group consisting of magnesium, aluminium, calcium and sodium wherein each of said solutes is present as a metal chloride and said solution has a pH of less than 1.0, said process comprising the steps of:
   i) adding a precipitating agent selected from the group consisting of calcium oxide and calcium hydroxide to raise the pH of said solution to approximately 1.0 thereby causing said iron to precipitate as ferric hydroxide;
   ii) separating said ferric hydroxide precipitate from the remaining solution;
   iii) adding more of said precipitating agent to said remaining solution to raise the pH of said remaining solution from step ii to approximately 3.0 thereby causing said copper to precipitate as cupric hydroxide;
   iv) separating said cupric hydroxide precipitate from the remaining solution;
   v) adding more of said precipitating agent to said remaining solution to increase the pH of said remaining solution from step iv to about 4.0 thereby causing said nickel to precipitate as nickel hydroxide;
   vi) separating said nickel hydroxide precipitate from the remaining solution;
   vii) adding more of said precipitating agent to said remaining solution to increase the pH of said remaining solution from step vi to approximately 8.8 thereby causing said contaminants to precipitate as their respective hydroxides;
   viii) separating said precipitated contaminants from the remaining solution;
   ix) adding a sufficient amount of sulphuric acid to said remaining solution from step viii to convert said remaining solution from step viii to calcium sulphate and hydrochloric acid; and
   x) separating said calcium sulphate from said hydrochloric acid.

2. A process for recovering metals from an ore concentrate containing gold, platinum, palladium, copper, nickel, iron, sulphur, and at least one contaminant selected from the group consisting of magnesium, aluminium, calcium and sodium, said process comprising the steps of
   i) roasting said concentrate in an oxygen containing environment at a temperature of from 900° F. to 1200° F. until the content of said sulphur in said concentrate is reduced to approximately 2% and thereby forming a roasted concentrate.
   ii) mixing said roasted concentrate with hydrochloric and nitric acids in a proportion of from 100 to 3 parts hydrochloric acid per part of nitric acid;
   iii) heating said mixture of roasted concentrate and hydrochloric and nitric acids to a temperature from about 100° F. to 288° F.;
   iv) maintaining said heated acid and roasted concentrate mixture in an oxygen environment having an oxygen gas pressure sufficient to regenerate at least some of said nitric acid for a period of time sufficient to allow substantial dissolution of said metals in said roasted concentrate to form a solution of said metals and said acids;

v) separating said gold from said solution by collection in activated carbon;

vi) separating a portion of said palladium from said solution by collection in activated carbon and separating the remainder of said palladium from said solution by mixing said solution with a suitable solvent extraction agent;

vii) separating a portion of said platinum from said solution by collection in activated carbon and separating the remainder of said platinum from said solution by cementation with copper powder, whereby said remaining solution contains iron, copper, nickel and at least one contaminant selected from the group consisting of magnesium, aluminum, calcium and sodium wherein each of said solutes is present as a metal chloride and said solution has a pH of less than 1.0;

viii) adding a precipitating agent selected from the group consisting of calcium oxide and calcium hydroxide to said remaining solution to raise the pH of said remaining solution to approximately 1.0 thereby causing said iron to precipitate as ferric hydroxide;

ix) separating said ferric hydroxide precipitate from the remaining solution;

x) adding more of said precipitating agent to raise the pH of said remaining solution from step ix to approximately 3.0 thereby causing said copper to precipitate as cupric hydroxide;

xi) separating said cupric hydroxide precipitate from the remaining solution;

xii) adding more of said precipitating agent to increase the pH of said remaining solution from step xi to about 4.0 thereby causing said nickel to precipitate as nickel hydroxide;

xiii) separating said nickel hydroxide precipitate from the remaining solution;

xiv) adding more of said precipitating agent to increase the pH of said remaining solution from step xiii to approximately 8.8 thereby causing said contaminants to precipitate as their respective hydroxides;

xv) separating said precipitated contaminants from the remaining solution;

xvi) adding a sufficient amount of sulphuric acid to said remaining solution from step xv to convert said remaining solution from step xv to calcium sulphate and hydrochloric acid; and xvii) separating said calcium sulphate from said hydrochloric acid.

3. A process according to claim 2 wherein:
said oxygen containing environment in step i is air;
said concentrate is rabbled during said roasting to promote oxidation of sulphur; and
said oxygen gas pressure in step iv is from 50 to 100 p.s.i.g.

4. A process according to claim 3, wherein said suitable solvent extraction agent is selected from the group consisting of dioctyl and dihexyl sulphide.

5. A process according to claim 2 wherein said suitable solvent extraction agent is selected from the group consisting of dioctyl and dihexyl sulphide.

6. A process according to any of claims 1, 2, 3, 4, or 5 wherein said steps of adding said precipitating agent to said solution are carried out from ambient temperature to the boiling temperature of the respective solution in each step.

7. A process according to any one of claims 1, 2, 3, 4, or 5 wherein said steps of adding said precipitating agent to said solution are carried out at a temperature of from 50° C. to the boiling temperature of the respective solution in each step.

* * * * *